United States Patent
McAtee

(10) Patent No.: US 7,441,369 B1
(45) Date of Patent: Oct. 28, 2008

(54) DEVICE FOR EFFICIENTLY DISPENSING FERTILIZER AND OTHER CHEMICALS TO THE ROOTS OF A PLANT

(76) Inventor: Joseph P. McAtee, 1613 Thistlewood Dr., Washington Crossing, PA (US) 18977

( * ) Notice: Subject to any disclaimer, the term of this patent is extended or adjusted under 35 U.S.C. 154(b) by 0 days.

(21) Appl. No.: 11/438,986

(22) Filed: May 24, 2006

(51) Int. Cl.
*A01G 29/00* (2006.01)
(52) U.S. Cl. ........................................... 47/48.5
(58) Field of Classification Search ........... 47/48.5; 43/132.1
See application file for complete search history.

(56) References Cited

U.S. PATENT DOCUMENTS

| | | | |
|---|---|---|---|
| 790,910 A * | 5/1905 | McClintock | 405/245 |
| 2,791,347 A * | 5/1957 | Boehm | 165/45 |
| 3,345,774 A * | 10/1967 | Delbuguet | 47/48.5 |
| 4,158,269 A * | 6/1979 | Williams et al. | 47/48.5 |
| 4,393,622 A * | 7/1983 | Gallo, Sr. | 47/48.5 |
| 4,843,758 A | 7/1989 | Raczkowski | 47/48.5 |
| 5,016,548 A * | 5/1991 | Ito | 111/114 |
| 5,809,691 A * | 9/1998 | Frantz | 47/40.5 |
| 6,202,342 B1 * | 3/2001 | Edwards | 43/132.1 |
| 6,598,338 B2 * | 7/2003 | Buss et al. | 47/48.5 |
| 6,716,421 B2 * | 4/2004 | Brode et al. | 424/84 |
| 7,225,585 B2 * | 6/2007 | Zayeratabat | 47/48.5 |

FOREIGN PATENT DOCUMENTS

JP 2004187557 A * 7/2004

* cited by examiner

*Primary Examiner*—Son T. Nguyen
(74) *Attorney, Agent, or Firm*—LaMorte & Associates

(57) ABSTRACT

A feeder tube and method for dispensing a selected compound to the roots of a specifically targeted plant. The feeder tube contains a tubular body having an open top end and an open bottom end. A plurality of perforations are formed through the tubular body that communicates with a central conduit. A penetration cap is provided that protrudes below the bottom end of the tubular body. The penetration cap has a pointed tip and a wide base that is wider than the tubular body. As the plant feeder tube is driven into the ground, the penetration cap advances into the ground and creates an opening in the ground that is wider than the tubular body. Consequently, dirt does not press against the perforations in the tubular body as it is driven below ground level.

8 Claims, 3 Drawing Sheets

DEVICE FOR EFFICIENTLY DISPENSING FERTILIZER AND OTHER CHEMICALS TO THE ROOTS OF A PLANT

BACKGROUND OF THE INVENTION

1. Field of the Invention

The present invention relates to subterranean feeding tubes and fertilizer stakes that are driven into the ground near a plant's roots for the purpose of dispensing chemicals for absorption by the plant roots. More particularly, the present invention relates to reusable subterranean plant feeding tubes and the structure of such plant feeding tubes.

2. Description of the Prior Art

Many plants grow better if kept properly fertilized and watered. In nature, outdoor plants are watered by rain and fertilized by the natural decomposition of organic material in the soil. However, as people move into deserts, mountains, beach communities and the like, the natural amounts of rain and the quality of soil may be insufficient to support many types of plants. Additionally, if a plant is planted in a pot, the volume of soil in the pot is typically insufficient to provide the organic materials needed by the plant. It is for these reasons that single-plant fertilizer products have been developed.

Garden fertilizers are typically mixed with water and applied to a plant as the plant is being watered. The problem with such application techniques is that the water carries the fertilizer. Thus, only some of the fertilizer seeps into the ground where it can be absorbed by a plant's roots. Much of the fertilizer runs away with the water spillover. Still more of the fertilizer passes through a pot or seeps below a plant's roots where it cannot be absorbed.

To help keep fertilizer in place, fertilizer has been made into stakes, sticks, and other configurations that can be driven directly into the ground. In this way, the fertilizer remains in close proximity to the roots of the plant and the plant can absorb the fertilizer over a prolonged period of time.

A problem with fertilizer stakes is that they tend to be expensive, as compared to loose fertilizers. Furthermore, a fertilizer stake can only deliver the type of fertilizer contained within that stake. Applications of other chemicals, such as insecticides, fungicides, ph conditioners, and the like must still be applied in the traditional manner.

An alternative to fertilizer stakes is the use of a plant feeder tube. A plant feeder tube is a perforated tube that is driven into the ground near the roots of a plant. The tube is then filled with any desired chemicals, such as fertilizers, pesticides, or the like. The applied chemicals slowly leach out of the holes in the tube, where the chemicals can be absorbed by the roots of the plant. Plant feeder tubes can also be used to directly water a plant. When water is poured into a plant feeder tube, the water flows through the perforations in the plant feeder tube where it can be absorbed by the plant's roots.

A problem associated with prior art plant feeder tubes is that perforations in the tube tend to quickly clog with dirt and roots as the plant feeder tube is driven into the ground. Once the perforations of a plant feeder tube become clogged, the contents of the plant feeder tube have no way to exit. As a result, the plant feeder tube becomes ineffective. It is for this reason that many prior art plant feeder tubes retain their contents under pressure. Using either an elevated reservoir or a watering hose pressure, the contents of the plant feeder tube are maintained at a pressure that is higher than ambient. Accordingly, when the plant feeder tube is driven into the ground, dirt and other debris will be prevented from falling into the tube's perforations. Prior art plant feeder tubes with pressurized interiors are exemplified by U.S. Pat. No. 4,843,758 to Raczkowski, entitled Regulated Automatic Plant Waterer.

The problem associated with pressurized plant feeder tubes is obvious. Either a hose must be connected to the plant feeder tube or the plant feeder tube must have a supply reservoir that is elevated above the ground. Accordingly, such prior art feeder tubes are cumbersome and unsightly.

A need therefore exists for an improved plant feeder tube design that is not pressurized, yet does not clog when driven into the ground. This need is met by the present invention as described and claimed below.

SUMMARY OF THE INVENTION

The present invention is a device and method for dispensing a selected compound to the roots of a specifically targeted plant. The device used is a plant feeder tube. The plant feeder tube contains a tubular body having an open top end and an open bottom end. The tubular body defines a central conduit that extends between the top end and the bottom end. A plurality of perforations are formed through the tubular body that communicates with the central conduit.

A penetration cap is provided that protrudes below the bottom end of the tubular body. The penetration cap has a pointed tip and a wide base that is wider than the tubular body.

The plant feeder tube is driven at least partially into the ground. As the plant feeder tube is driven into the ground, the penetration cap advances into the ground and creates an opening in the ground that is wider than the tubular body. Consequently, dirt does not press against the perforations in the tubular body as it is driven below ground level.

The tubular body of the plant feeder tube is filled with the compound to be dispensed. The compound laterally migrates through the perforated tubular body and into the surrounding ground where it can be absorbed by the roots of a plant.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention device can be used to water and fertilize many different types of plants, such as potted houseplants, it is especially useful for watering and fertilizing outdoor plants. According, by way of example, the present invention will be described in an application where it is inserted into the ground next to an outdoor plant. This exemplary embodiment is intended to only set forth one of the best modes contemplated for the invention and should not be considered a limitation or restriction on the invention.

Figure 1:
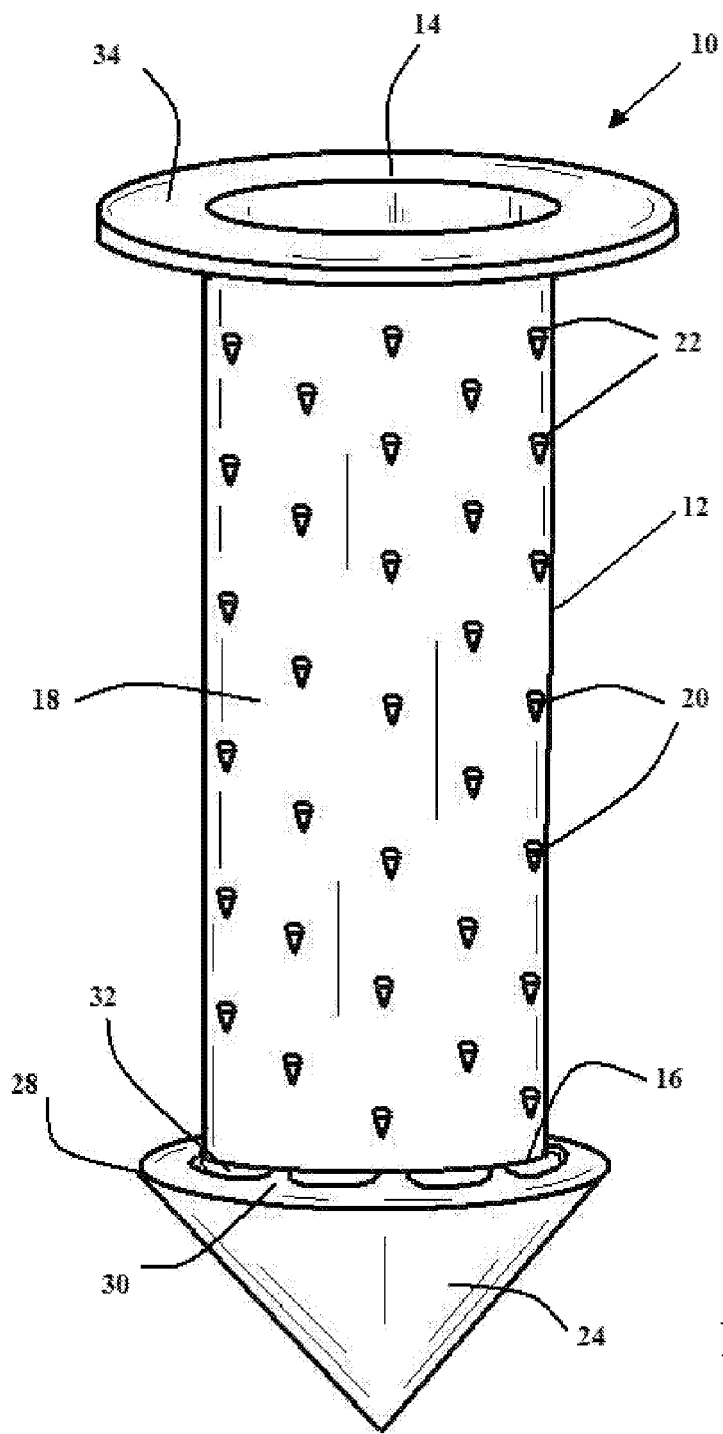
FIG. 1 is a perspective view of an exemplary embodiment of the present invention.

Referring to FIG. 1, a plant feeder tube device 10 is shown. The plant feeder tube device has a tubular body 12 that extends between a top end 14 and a bottom end 16. The tubular body 12 has a uniform diameter along its length, except for the presence of small protective bulges 20.

The peripheral wall 18 that defines the tubular body 12 is perforated. The peripheral wall 18 of the tubular body 12 is bulged directly below each of the perforations 22, much in the same manner as the perforations in a cheese grater. The protective bulges 20 serve two purposes. First, the protective bulges 20 enable the perforations 22 to be oriented slightly upwardly so that the perforations 22 need not be flush on the vertical parts of the peripheral wall 18. This slight upward-facing orientation helps prevent dirt and other debris from being pushed into one of the perforations 22 as the plant feeder tube device 10 is driven into the ground. Second, the protective bulge 20 under each of the perforations 22 acts as a deflection baffle that also prevents dirt from being pressed into any perforation 22.

The protective bulges 20, and the perforations 22 they support, are arranged in a matrix of vertical columns. By orienting the protective bulges 20 and perforations 22 in vertical columns, the protective bulges 20 protect each other. As the plant feeder tube device 10 is driven into the ground, suppose a clump of dirt falls against the tubular body 12. The first protective bulge 20 that presses against the clump of dirt will displace a groove in that dirt. The clump of dirt, therefore, will not contact the subsequent protective bulges 20 in that column as the plant feeder tube device 10 descends. The perforations 20 are, therefore, not only protected by their own protective bulge 20 but by previous protective bulges 20 in that same vertical column.

A penetration cap 24 is attached to the bottom end 16 of the tubular body 12. The penetration cap 24 has a pointed tip 26 and a wide base 28. The pointed tip 26 helps the penetration cap 24 pass through the dirt and into the ground. The wide base 28 of the penetration cap 24 is large and has an area that is larger than the bottom end 16 of the tubular body 12. The wide base 28 of the penetration cap 24 is connected to the bottom end 16 of the tubular body 12 with support elements 30. Gaps 32 exist between the support elements 30. These gaps 32 help the contents of the plant feeder tube device 10 drain, as will later be explained.

A rim structure 34 is provided at the top end 14 of the tubular body 12. The rim structure 34 radially extends from the top end 14 of the tubular body 12. The rim structure 34 serves three purposes. First, the rim structure 34 provides a flat, wide surface that can be struck with a hammer when the plant feeder tube device 10 is being driven into the ground. Second, the rim structure 34 prevents the plant feeder tube assembly 10 from being driven below ground level. When the plant feeder tube assembly 10 is being driven into the ground, the rim structure 34 eventually abuts against the ground and prevents any further decent into the ground. Third, the rim structure 34 provides a surface that can readily be grasped or pried in order to pull the plant feeder tube assembly 10 up out of the ground.

Figure 2:
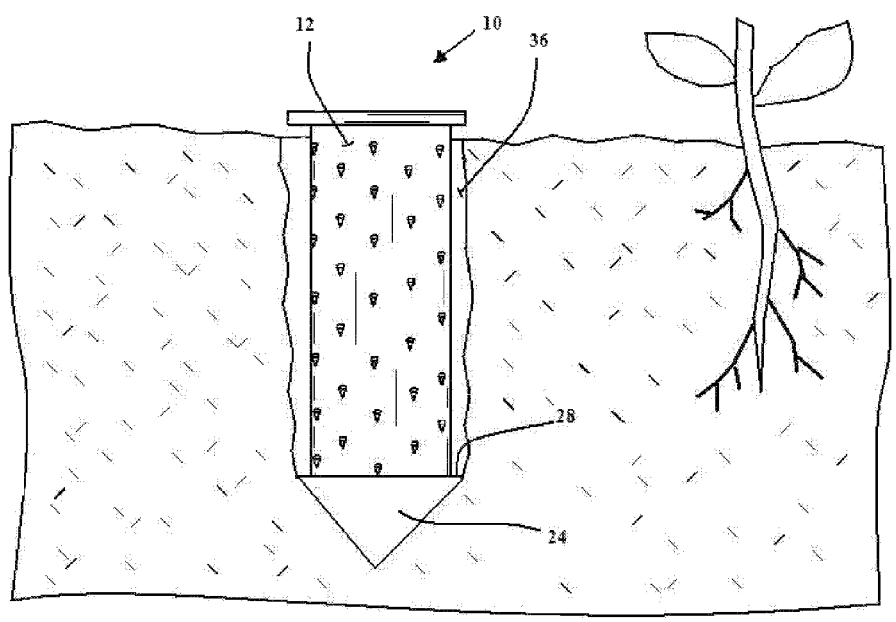
FIG. 2 shows the embodiment of FIG. 1 driven into the ground near the roots of a plant.

Referring solely to FIG. 2, it can be seen that when the plant feeder tube assembly 10 is driven into the ground, the penetration cap 24 is the first element to contact the ground. It is also the penetration cap 24 that is eventually driven the deepest into the ground. The wide base 28 of the penetration cap 24 is the widest section of the plant feeder tube device 10 that enters the ground. Consequently, when the plant feeder tube assembly 10 is driven into the ground, the penetration cap 24 displaces the earth and creates a void 36 in the ground behind the wide base 28 of the penetration cap 24. The void 36 has the same diameter as the wide base 28 of the penetration cap 24. Consequently, the void 36 is larger than the tubular body 12 that passes behind the penetration cap 24. Since the void 36 is larger than the tubular body 12, the void 36 separates the tubular body 12 from the surrounding earth. Consequently, no earth abuts against the tubular body 12 as the plant feeder tube device 10 is driven into the ground.

Figure 3:
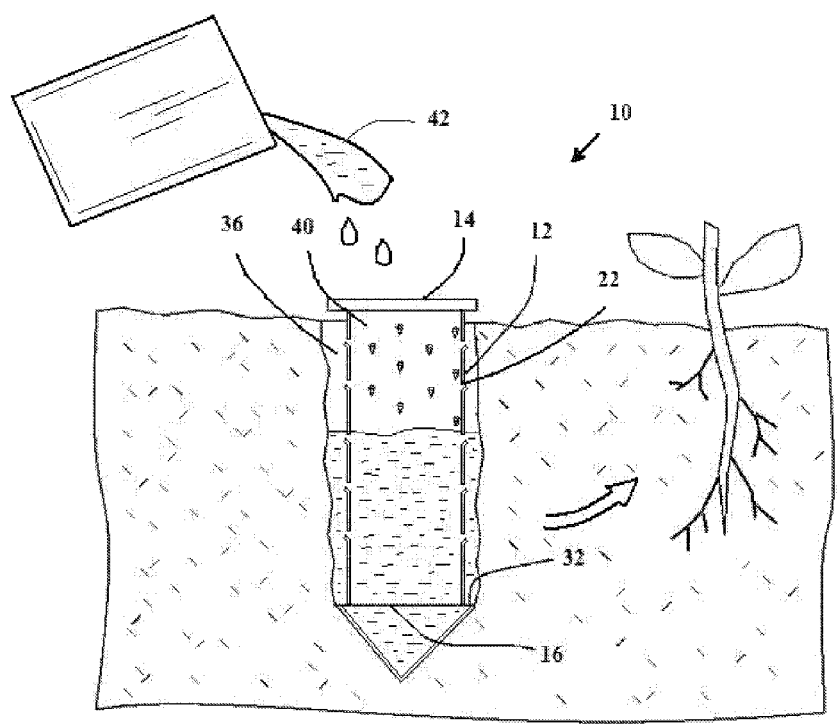
FIG. 3 shows a cross-sectional view of the embodiment of FIG. 2.

Referring to FIG. 3, it can be seen that the tubular body 12 defines an open central chamber 40. The top end 14 and the bottom end 16 of the tubular body 12 are open. The open central chamber 40 extends between the top end 14 and the bottom end 16 of the tubular body 12. The perforations 22 extend through the peripheral wall 18 of the tubular body 12 and communicate with the open central chamber 40. The gaps 32 in between the support elements 30 also communicate with the open central chamber 40.

A composition 42 is poured through the open top end 14 of the tubular body 12 and into the open central chamber 40. The composition can be fertilizer, insecticide, fungicide, and/or water. As the composition 42 fills the open central chamber 40, the composition 42 immediately flows outside the tubular body 12 through the gaps 32 and the perforations 22. Consequently, the composition 42 fills the void 36 in between the tubular body 12 and the surrounding earth. The composition 42 located outside the tubular body 12 cannot seep directly down because of the presence of the water impervious penetration cap 24 below the void 36. Consequently, the composition 42 must be laterally absorbed into the surrounding earth. The composition 42 therefore passes into the earth immediately surrounding the plant feeder tube device 10. As the composition 42 is absorbed, it is replenished by the reservoir of the composition 42 that is still located inside the open central chamber 40 of the tubular body 12. Eventually, the contents of the tubular body 12 will empty. By positioning the large gaps 32 at the bottom end 16 of the tubular body 12, it is assured that nearly the entire contents of the tubular body 12 will empty into the surrounding earth over time.

Since the components of the plant feeder tube device 10 disperse laterally into the surrounding earth, the contents of the plant feeder tube device 10 are dispersed to the level of earth where the highest concentration of plant roots are located. This makes the plant feeder tube device 10 highly efficient at dispensing. Thus, smaller amounts of fertilizer or other chemicals need to be used in order to have the desired effect on the plant.

It will be understood that the embodiment of the present invention plant feeder tube device that has been illustrated and described is merely exemplary. A person skilled in the art can make many variations to the shown embodiment without departing from the intended scope of the invention. For instance, the length, diameter and peripheral shape of the plant feeder tube assembly can be altered as a matter of design choice. Furthermore, the number, shape, size and location of the various perforations can also be selectively altered. All such variations, modifications and alternate embodiments are intended to be included within the scope of the present invention as set forth by the claims.

What is claimed is:

1. A device for dispensing a selected compound to the roots of a plant, said device comprising:
   a tubular body having an open top end and an open bottom end, said tubular body defining a central conduit between said top end and said bottom end;
   a plurality of protective bulges protruding from said tubular body;
   a plurality of perforations formed through said protective bulges that communicate with said central conduit;
   a penetration cap protruding below said bottom end of said tubular body, said penetration cap having a pointed tip and a wide base that is wider than said tubular body; and
   support elements radially extending between said bottom end of said tubular body and said penetration cap, wherein unobstructed gaps exist between said tubular body and said penetration cap in between said support elements that provides access to said central conduit.

2. The device according to claim 1, further including a rim structure radially extending from said top end of said tubular body.

3. The device according to claim 2, wherein said rim structure is wider than said wide base of said penetration cap.

4. The device according to claim 1, wherein said perforations are arranged in a plurality of vertical rows.

5. A plant feeder tube device, comprising:
a perforated tubular body that defines a central conduit between a top end and a bottom end;
a pointed cap that is wider than said tubular body;
support elements radially extending between said bottom end of said tubular body and said pointed cap, therein joining said pointed cap to said tubular body, wherein unobstructed gaps exist between said tubular body and said pointed cap in between said support elements; and
a rim structure radially extending from said top end of said tubular body, wherein said rim structure is wider than both said tubular body and said pointed cap.

6. The device according to claim 5, wherein said pointed cap is coupled to said bottom end of said tubular body with support elements, wherein gaps exist between said support elements and between said bottom end and said pointed cap.

7. The device according to claim 5, further including a plurality of protective bulges protruding from said tubular body, wherein a perforation is formed through said tubular body in each of said bulges.

8. The device according to claim 7, wherein each of said protective bulges is arranged in a plurality of vertical rows on said tubular body.

* * * * *